S. D. SIZER.
METHOD OF ATTACHING BITS ECCENTRICALLY TO THEIR ARBORS.
No. 3,090. Patented May 19, 1843.
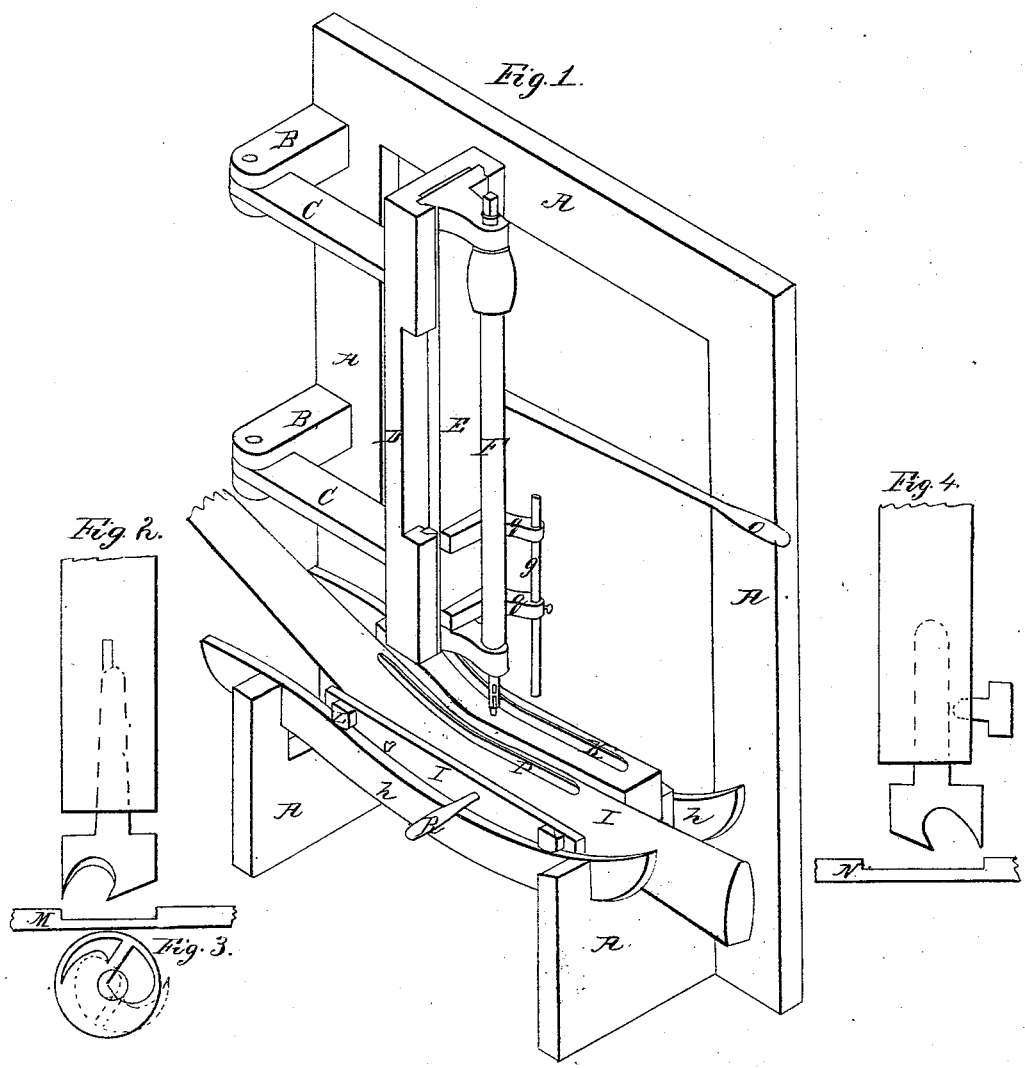

UNITED STATES PATENT OFFICE.

SAMUEL D. SIZER, OF SPRINGFIELD, MASSACHUSETTS.

METHOD OF ATTACHING BITS ECCENTRICALLY TO THEIR ARBORS, TO BE USED IN MACHINERY FOR STOCKING GUNS AND OTHER PURPOSES.

Specification of Letters Patent No. 3,090, dated May 19, 1843.

*To all whom it may concern:*

Be it known that I, SAMUEL D. SIZER, of Springfield, in the county of Hampden, in the State of Massachusetts, have invented a new and useful improvement on stocking-machines for stocking guns—viz., the machines for cutting in the locks, guard-plates, side plates, breech-plates, rod-springs, barrels, &c.—to gun-stocks; and I do hereby declare that the following is a clear, full, and exact description of the construction and operation of the same.

My said improvement consists in attaching a bit or cutter to an arbor by a spindle out of the axis of the arbor or eccentric thereto so that by turning the bit or cutter on its arbor the diameter of its cut shall be increased or decreased which enables the operator to cut his work to an exact fit as shown in the annexed drawings making a part of this specification in which—

Figure 1 is a perspective view; Fig. 2, a sectional view of the arbor with the bit attached; Fig. 3, an end view of the bit in its place represented by lines and then by dots representing the different positions of the bit when turned on its spindle; Fig. 4, a sectional view of the same arbor with the bit turned forward on its arbor.

The letters A, A A A the frame to which the machine is attached; B B, the arms extending from the frame at right angles; C C, the arms extending at right angles backside of perpendicular plate D, and forming the hinges with B, B; E, the slider; F, the arbor; G, the gage rod attached to the slider by arms q q; I, the carriage on which the gunstock and former rest; J, the gun stock; K, the former; P, the groove cut in the gun stock to receive the guard plate; L, L, the two front bearings of the carriage on which the gun stock and former rest; R, the handle to move the carriage; H, H, the ways on which the carriage moves; O, the lever that moves the slider E in a perpendicular direction also to right and left horizontally turning on the hinges; B C, the perpendicular plate; D, forms the ways for the slider E the bearings of the arbor and the arms of the gage rod G being fastened to the slider the arbor gage rod and slider move in the same direction together. In cutting in the guard I place the gun stock on the carriage against the side of the former and parallel to it with the right hand, bear down the lever O until the gage rod strikes the bottom of the former when the bit will have cut the right depth in the stock then bear to right and left until the gage rod touches the side of the former with the left hand move the carriage by the handle R backward and forward until the ends of the former touch the gage rod which will, the bit being the right size, cut the exact shape to fit the guard. I make my former the exact shape of the lock guard of whatever is required to be let into the wood and the gage rod as large in diameter as the shortest turns in the former will admit and the bit or cutter a trifle smaller than the gage rod if the bit cuts too small turn it forward on its arbor until it cuts the size required which is done in a moment without the alteration of any other part of the machine. This obviates the difficulty that has heretofore existed in stocking machinery, there being no remedy for the enlargement of the bit when too small or the size reduced by frequent sharpening consequently the superfluous wood was left on the stock and paired off by hand. Fig. 2 represents a section of the arbor with a tapering hole the spindle of the bit being well fitted to it and pressed in requires no other fastening—if the spindle is not tapered a binding screw is necessary as shown in Fig. 4. In Fig. 2 I make the bit one inch in diameter and the center of the spindle hole one sixteenth of an inch to the right hand of the axis of the arbor and the cutting edge in the side of the bit to the left which is the starting point cutting one inch in diameter as shown at M. Fig. 4 represents the bit expanded, the cutting edge in the side turned forward to the right hand cutting one inch and a quarter as shown at N, M and N showing the extremes of the cut of the same bit. I make the eccentric attachment of the bit to its arbor about one twentieth of an inch out of the axis of the arbor which is sufficient in most cases.

What I claim as my invention and desire to secure by Letters Patent is—

Attaching a bit or cutter to an arbor by a spindle out of the axis of the arbor or eccentric thereto so that by turning the bit or cutter on its arbor the diameter of its cut shall be increased or decreased as herein described applied to machinery for stocking guns and for other mortise work when required besides making gun stocks.

SAMUEL D. SIZER.

Witnesses:
 WILLIAM BISHOP,
 HENRY BISHOP.